United States Patent [19]

Scott

[11] 4,189,621
[45] Feb. 19, 1980

[54] CMI-ENCODER

[75] Inventor: Peter M. Scott, Edinburgh, Scotland

[73] Assignee: Hewlett-Packard Company, Palo Alto, Calif.

[21] Appl. No.: 874,719

[22] Filed: Feb. 3, 1978

[30] Foreign Application Priority Data

Feb. 9, 1977 [GB] United Kingdom ............... 5408/77

[51] Int. Cl.² ............................................. H03K 13/24
[52] U.S. Cl. ....................................... 178/67; 178/68; 360/40
[58] Field of Search .................. 340/347 DD; 178/68, 178/67; 360/40–44; 323/38 R, 321

[56] References Cited

U.S. PATENT DOCUMENTS

3,953,673   4/1974   Dorward ................ 178/68

FOREIGN PATENT DOCUMENTS

| | | | |
|---|---|---|---|
| 1809281 | 10/1977 | Fed. Rep. of Germany | 178/68 |
| 1948533 | 12/1977 | Fed. Rep. of Germany | 178/68 |
| 1251878 | 11/1971 | United Kingdom | 178/69.1 |
| 1265213 | 3/1972 | United Kingdom | 178/67 |
| 1293812 | 10/1972 | United Kingdom | 178/53.1 |
| 1376081 | 12/1974 | United Kingdom | 178/88 |
| 1489178 | 1/1975 | United Kingdom | 178/66 A |
| 1190099 | 4/1976 | United Kingdom | 178/66 R |
| 1489177 | 10/1977 | United Kingdom | 178/68 |

OTHER PUBLICATIONS

"Some Techniques PCM" Bull. SEV. Bd. 51 (1960), Nr.20, Oct. 8, 1960, Neu.

"Clarification of Definition of CMI Interface at 140 MBIT/S", C.C.I.T.T. study GP 18, Jul. 1977.

"An Equipment Interface Code for Operating Rates Above 100 MBIT/S", C.C.I.T.T. study GP D-#14, Feb. 1974.

"A New Class of Selected Ternary Pulse Transmission Plans for Digital Transmission Lines", Sipress, IEEE Trans. Com., vol. 13, No. 3, Sep. 1965, pp. 366–372.

*Primary Examiner*—Robert L. Griffin
*Assistant Examiner*—Peter Durigon
*Attorney, Agent, or Firm*—David A. Boone; Robert S. Hulse

[57] ABSTRACT

An encoding circuit provides an improved interface code of the CMI (Code Mark Inversion) type for transferring binary information between different points within terminal stations for digital communication, such as telephone exchange stations. Encoded output signals, in the CMI format or code, are produced with respect to a clock related signal in a manner such that each positive or negative transition of the encoded output signals occur at the end or at the beginning of a data bit period of the output signals, irrespective of whether the binary value of the input signals to be encoded is 0 or 1. Signal trailing edges, which are to be used for clock recovery by a subsequent decoder, are triggered by clock pulses, and are not derived from different signal channels of the encoding circuitry which, typically, would have made the relative phasing of the signals in the channels critical.

8 Claims, 6 Drawing Figures

CMI-ENCODER

BACKGROUND OF THE INVENTION

This invention relates to circuitry for encoding binary signals that are typically of the "non-return-to-zero" (NRZ) type into signals that are of the "code mark inversion" (CMI) type.

The CMI code was first introduced in a published contribution (proposal No. 14) to the International Telegraph and Telephone Consultative Committee (C.C.I.T.T.), entitled "An equipment interface code for operating rates above 100 M bits/s", dated Feb. 1974. This code is primarily used as an interface code for transferring binary information between different points within terminal stations for digital communication, e.g., within a telephone exchange station. The underlying principle of the CMI code has been known since the publication by W. Neu, in Bull. Sev., 51, 1960, on page 978–980. In the CMI code, binary 0 is represented by both amplitude levels being attained consecutively, each for a half a unit time interval, and binary 1 is represented by either of the amplitude levels being attained for one full unit time interval, the level alternating for successive binary 1's.

Another important characteristic of this code is that all negative transistions occur at a time coincident with the start of a binary unit time interval which allows the clock information to be recovered at the receiving end, thus no extra clock transmission line is needed.

A simple design of a CMI encoder is shown in British Pat. No. 1,251,878. With this and other previously known encoding concepts for CMI codes the signals from the signal channels have to be closely timed relative to each other, as the timing of the output signals is affected by any signal propagation delays in the logic and storage elements as well as by any time shifts between the clock pulses and data signals. Otherwise, either glitches which affect the logic information or pulse narrowing which affects the clock recovery will occur at the output logic gates of the signal channels.

A major characteristic of CMI encoded signals is that they have no DC component since each of the two logic levels of the NRZ-signals is encoded by a pulse pattern which has the same amount of upper levels as lower levels. As this method of encoding can occur in different manners for CMI code related signals such as NRZ signals, (see e.g., U.S. Pat. No. 3,953,673), reference will be made herein to CMI code related signals generally. However, for the purpose of simplicity, the further explanation will start from a single one out of the many possible code definitions, with the understanding that a subsequent encoder could easily be modified for encoding any of the CMI code related signals without departing from the inventive concept.

FIG. 2 of the above mentioned prepublished proposal to the C.C.I.T.T. discloses an encoding circuit for implementing the CMI code. This known encoding circuit includes a signal channel with flipflop and gating circuit for deriving from an NRZ input signal and from a clock input pulse a signal representing a logical "1" to be applied to one input of an AND-gate. A clock channel is connected to an inverting input of another AND-gate to establish the logical "0". Furthermore, there is a control channel for transferring the input NRZ signals to second inputs of the ANDgates in order to enable the one and to disable the other of these gates depending on the actual binary value of the NRZ signals. The outputs of both AND-gates are connected to an OR-gate for delivering the CMI encoded signal.

With this known encoding concept, the signals from the three signal channels should be closely timed relative to each other as the CMI output signals are composed of waveform sections from the clock channel for the logical "0" and from the signal channel for the logical "1." Otherwise the trailing signal edges in the CMI waveform for the logical "1" may be shifted in time with regard to the trailing signal edges derived from the clock channel. Furthermore, the flipflop and gating circuitry of the signal channel introduce delays in the signal flow relative to the signals in the other two channels. Thus either glitches which affect the logic information, or pulse narrowing which affects the clock recovery, will occur at the output of the logic gates which combine the signals from these three signal channels.

SUMMARY OF THE INVENTION

In accordance with the illustrated preferred embodiment of the present invention, a circuit is provided for deriving from binary input signals in the non-return-to-zero (NRZ) format (i.e., binary signals of the NRZ type) and from clock related pulses, binary signals in (related to) the CMI type format where the one binary level is represented by clock or $\overline{\text{clock}}$ signals and the other binary level is represented by signals in the return-to-zero (RZ) format divided by two. The circuit comprises first, second and third signal channels and an output gating circuit. The first signal channel includes an input connected to receive clock related pulses and a delay circuit for delaying the clock related pulses by a predetermined amount of time. The second signal channel includes an input connected to receive the clock related pulses and an input connected to receive NRZ signals to be encoded in the CMI format, and further includes a gating and flipflop circuit with at least one logic gate and one flipflop connected to each other for deriving from the input NRZ signals a sequence of signals related to RZ signals (i.e., in the RZ format) divided by two. The third signal channel is connected to receive NRZ signals and to derive signals related to these NRZ signals. The output gating circuit is connected to receive the signals from the three signal channels and to derive a sequence of CMI code related signals in response to the input NRZ signals, in which sequence of CMI encoded signals the rising or the falling signal edges are triggered by the clock related pulses from the first signal channel in response to the occurrence of a "1" binary level of the input NRZ signals. The third signal channel includes at least one flipflop with an input connected to receive NRZ signals and another input connected to receive clock signals. The output gating circuit includes a signal combining circuit disposed to logically combine the output signals from the flipflops in the second and third signal channels in order to derive a sequence of control signals to be supplied to a clock switching circuit connected to the first signal channel. The delay caused by the delay circuit to the clock related pulses from the first signal channel relative to the delay of the control signals from the second and third signal channels is greater than $(n-\frac{1}{4})$ and smaller than $(n+\frac{1}{4})$ clock periods, where n is an integer. The transfer functions of the signal combining circuit and of the clock switching circuit interact so that CMI-code-related signals are obtained at the output of the clock switching circuit, the rising or falling edges of which CMI-code-related output signals are triggered by the rising or falling edges of pulses from the first signal channel, independently of the actual level of the input NRZ-signals to be encoded.

According to a second and a third alternative embodiment of the invention, there are provided data signalling systems each comprising means for receiving clock pulses and incoming binary signals and a signal processing circuit for producing from an incoming signal of binary 0 an output signal of binary 01 or 10, and producing from an incoming signal of binary 1 an output signal of binary 00 or 11. The signal processing circuit being effective for causing each positive or negative transition of the output signal to occur at the end or beginning of a data bit period of the output signal, and to be clocked by a clock signal.

By means of the circuit of the present invention, a CMI encoded waveform is produced in which the trailing edges are triggered by clock pulses such that switching time shifts smaller than a quarter of a clock time interval in the signal channels do not affect the occurrence of the trailing signal edges in the sequence of CMI encoded output signals. Contrary to those of prior art circuits, therefore, the trailing signal edges are not derived from two different signal channels where the relative phasing of the signals in these channels is critical. Furthermore, the switching delays in the two signal channels of the encoder circuit of the present invention are equalized since both signal channels include flipflops which may be selected and arranged in a back-to-back fashion to have somewhat similar temperature-dependent switching characteristics. As these flipflops are all triggered by clock or clock pulses, the switching of these flipflops is no longer dependent on logic gates connected to receive NRZ signals.

BRIEF DESCRIPTION OF THE DRAWINGS

Preferred embodiments of the invention are described, by way of example following, with reference to the accompanying drawings, in which.

DESCRIPTION OF THE PREFERRED EMBODIMENT

Figure 1:
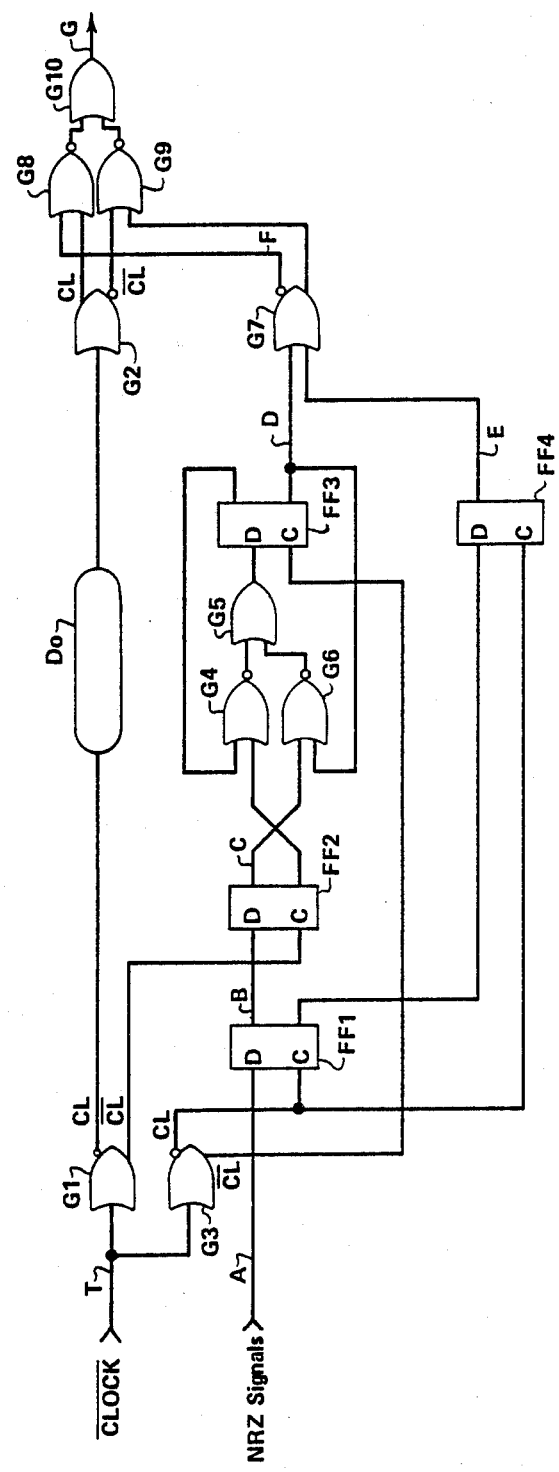
FIG. 1 is a schematic diagram of a CMI encoder logic circuit of the present invention, in which all trailing (falling) and all rising (leading) signal edges are derived directly from clock-related pulses in a clock channel.

In the encoder circuit according to FIG. 1, there is shown a clock signal channel (as a first signal channel) including an OR-gate G1 with an inverted output connected to a delay circuit $D_0$. The other end of this delay circuit $D_0$ is connected to an OR-gate G2.

A second signal channel includes a delay flipflop FF1 with a clock input connected to an inverted output of an OR-gate G3 having its only input connected to input T of OR-gate G1. The non-inverted output B of delay flipflop FF1 is connected to the D-input of a delay flipflop FF2, which has a clock input connected to a non-inverted output of OR-gate G1. An inverted output of the delay flipflop FF2 is connected to one input of a NOR-gate G4 whose output is connected, via an OR-gate G5, to a D-input of a delay flipflop FF3. A non-inverted output (from the D-output) of flipflop FF3 is coupled back to another input of NORgate G4. A non-inverted output C from the delay flipflop FF2 is connected to one input of a NOR-gate G6, the output of which is also connected, via OR-gate G5, to the D-input of delay flipflop FF3. An inverted output D from delay flipflop FF3 is coupled back to another input of NOR-gate G6. The delay flip-flop FF3 also has a clock input connected to a non-inverted output of OR-gate G3. The inverted output D of the delay flipflop FF3 is also connected to an input of an OR-gate G7.

A third signal channel has a delay flipflop FF4 with a D-input connected to an inverted output of delay flipflop FF1, with a clock input connected to the inverted output of OR-gate G3, and with a non-inverted output E connected to another input of OR-gate G7.

A non-inverted output of OR-gate G2 in the clock channel is connected to one input of a NOR-gate G8, while an inverted output of the OR-gate G2 is connected to one input of another NOR-gate G9. An inverted output F of OR-gate G7 is connected to another input of NOR-gate G8, while a non-inverted output of the OR-gate G7 is connected to another input of NOR-gate G9. The outputs of NOR-gates G8 and G9 are connected as inputs to an OR-gate G10 which forms the common output G of the CMI encoder circuit.

Figure 2:
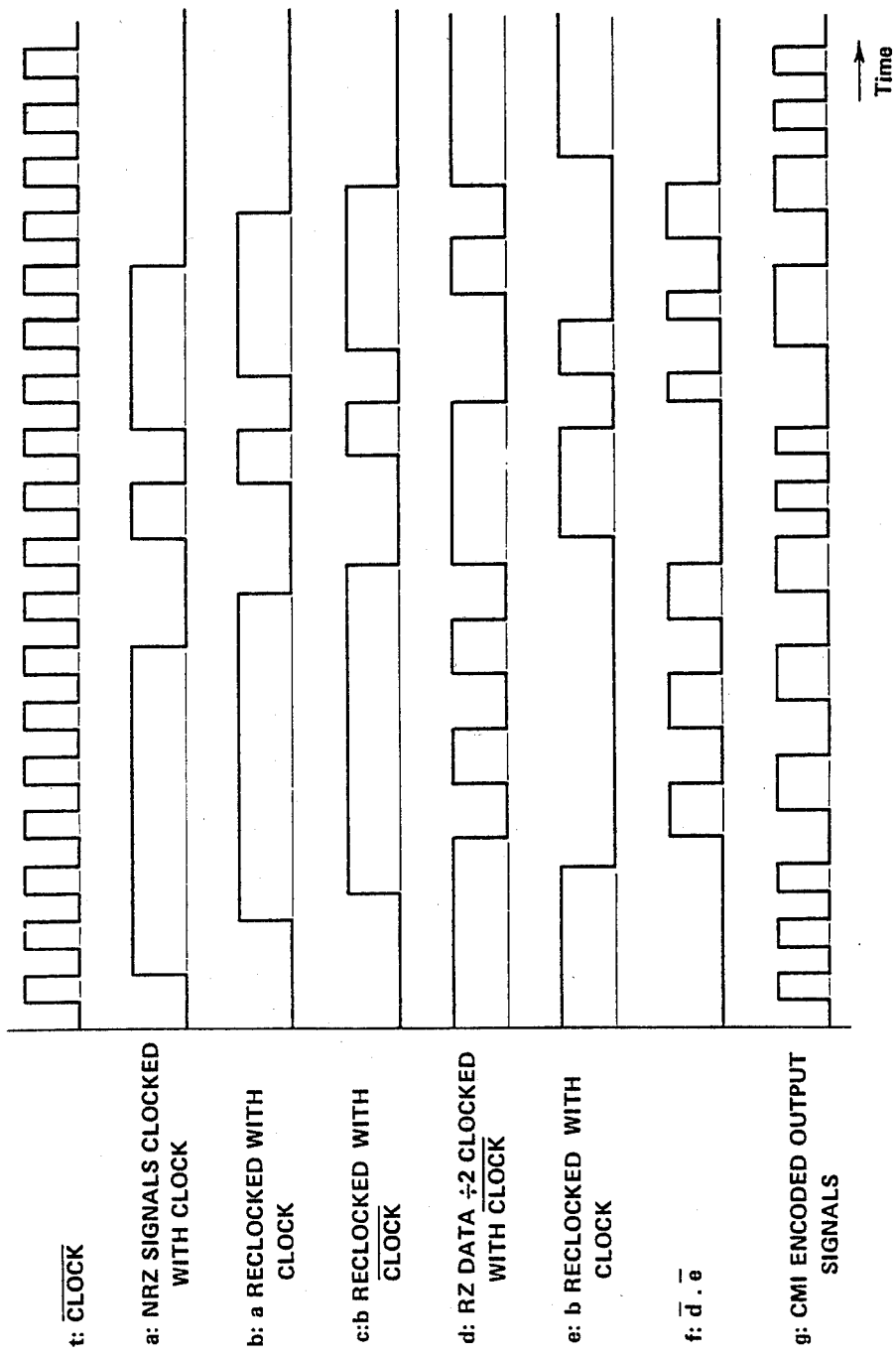
FIG. 2 is a timing diagram of input signals t and a occurring at points T and A, respectively, and of resulting signals b through g occurring at points B through G, repectively, in the circuit according to FIG. 1.

Waveforms "a" through "g" of FIG. 2 illustrate the binary signals occurring on lines B through G of the circuit according to FIG. 1 when NRZ signals (shown as waveform "a" in FIG. 2) are applied to an input line A and clock signals are applied to an input line T of the circuitry according to FIG. 1.

By the interaction of OR-gate G3 with D-flipflop FF1, the signals on line B are time shifted by one clock period with respect to the NRZ signals on input line A. By the interaction of the non-inverted output of OR-gate G1 with the clock input of D-flipflop FF2, the signals at the non-inverted output C of delay flipflop FF2 are delayed by half a clock period over the signals received from the non-inverted output B of delay flipflop FF1. By the interaction of the inverted and non-inverted outputs from delay flipflop FF2 with delay flipflop FF3, the feedback to NOR-gate G4 and G6, the output to OR-gate G5, and the clock input from the non-inverted output of OR-gate G3, the digital waveform "d" shown in FIG. 2 is made to occur at the inverted output D of delay flipflop FF3. This waveform consists of RZ data divided by 2 and clocked with clock signal clock, denoted as waveform "t" in FIG. 2.

More specifically, a logic "1" at the non-inverted output of delay flipflop FF2 will disable NOR-gate G6 and will enable NOR-gate G5. Thus, the signal at the non-inverted output D of delay flipflop FF3 will be fed back to its D-input but inverted by NOR-gate G4. Consequently, the logic state of the signal at the output of delay flipflop FF3 will change each time the delay flipflop is clocked. If a logic "0" appears on line C, NOR-gate G6 will be enabled and NOR-gate G4 will be disabled, and the signal at the non-inverted output of delay flipflop FF3 will be fed back through the inversion by NOR-gate G6. Thus, the total feedback is non-inverting, and the logic state of delay flipflop FF3 is held constant each time it is clocked.

By applying, from the inverted output of delay flipflop FF1 to the D-input of delay flipflop FF4, the complement of the signals shown as waveform "b" (in FIG. 2), and by applying clock signals from the inverted output of OR-gate G3 to the clock input of this delay flipflop (FF4), NRZ-signals reclocked with clock (depicted as waveform "e") are made to occur on the non-inverted output E of D-flipflop FF4 as shown in FIG. 2.

By applying the signals on lines D and E to the inputs of OR-gate G7, the signals shown as waveform "f" (FIG. 2) are made to occur at the inverted output F of OR-gate G7, which signals are hereinafter referred to as "commutating signals".

This commutating operation may be represented as follows:

$$\text{Commutating Signal } f = (\overline{NRZ}) \cdot \frac{\Delta^{\frac{1}{2}}}{\Delta^{\frac{1}{2}} \oplus 1} NRZ$$

where $\Delta^{\frac{1}{2}}$ represents a delay of half a clock period, NRZ represents non-return-to-zero input signals, the operator"." designates a logical AND operation and the operator "$\oplus$" designates a logical EXCLUSIVE OR operation.

A level representing a logic state of "0" in input NRZ-signals at input A causes a signal representing a logical "1", delayed by two clock periods, to be applied to line E. Thus, a logical "0" occurs on line F independently from the signal level on line D, and NOR-gate G8 enabled while NOR-gate G9 is disabled by a logical "1" at the non-inverted output from OR-gate G7. Consequently, $\overline{\text{clock}}$-signals are made to occur at the output of NOR-gate G8, and are passed to the output G.

A level representing a logical "1" in the input NRZ-signals at input A causes a signal representing a logical "0", delayed by two clock periods, to be applied to line E. Thus, the inversion of the signal on line D, (namely the commutating signal) is made to occur on line F. If the signal on line F has the logic level "1", NOR-gate G8 will be disabled and NOR-gate G9 will be enabled. Coversely, if the signal on line F has the logic level "0", NOR-gate G8 will be enabled and NOR-gate G9 will be disabled. In summary, the signals on the outputs of OR-gate G7 determine whether NOR-gate G8 or NOR-gate G9 is enabled, which enablement would cause the "RZ divided by two" signal, delayed by two clock periods relative to the respective level "1" in the NRZ signal, to be applied at output G. It should be noted that this signal (at output G) is composed of sections from the $\overline{\text{clock}}$ stream and from the clock stream from OR-gate G2. It should also be noted that all trailing signal edges in the output signal waveform are derived from the $\overline{\text{clock}}$ pulses of the clock channel, and that the commutating signals do not determine the points in time at which these trailing signal edges occur. Thus, any phase shift, in the commutating function (operation) or its inverse function, which is less than a quarter of a clock period does not affect the timing of the occurrence of the trailing signal edges, so that undistorted clock information is obtained in the CMI-output signal without the need for closely timing all signals in the three forward channels.

The delay between the clock path and the commutating path should ideally be zero, in which event the advancing or retarding of the clock signal stream with respect to the commutating signal will have no effect on the relative position of the transitions of the encoded outputs, since all the transitions are derived directly from the clock stream only. However, advancing or retarding the clock stream will give rise to glitches with width equal to the magnitude of the advance or retardation.

Furthermore, delay flipflops FF3 and FF4 can be arranged back to back so that they will have the same temperature-depenendent-switching delay characteristics. Both delay flip-flops FF3 and FF4 are clocked by outputs from the OR gate G3 and, thus, the same gating delays are involved in both signal channels. Since delay circuit $D_O$ has a delay which is approximately equal to the delay of the output signals from delay flipflops FF3 and FF4, the circuit provides symmetrical delays in the two (second and third) signal channels because the delays caused by FF3 and FF4 are compensated for by the delay caused by delay circuit $D_O$, and because the gating delay introduced by OR gate G1 corresponds substantially to the delay introduced by the OR gate G3, the delay of OR gate G2 corresponds substantially to that of OR gate G7, and the delay of NOR gate G8 corresponds substantially to that of NOR gate G9.

Figure 3:
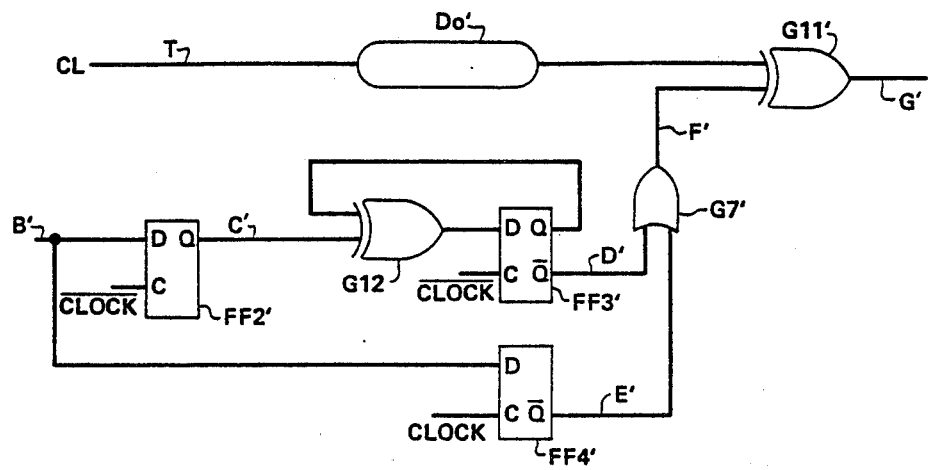
FIG. 3 is a schematic diagram of a second preferred embodiment of the CMI encoder logic circuit of the present invention for deriving all trailing signal edges in the CMI encoded output signals from clock related pulses.

FIG. 3 illustrates another embodiment of an improved CMI-encoder circuit. A clock channel includes a delay circuit $D_O'$ connected between an input T for clock signals and one input of an EXCLUSIVE-OR gate G11'.

The NRZ-signals to be encoded are supplied to an input B' of a delay flipflop FF2'. This delay flipflop is clocked with signal $\overline{\text{clock}}$ and delivers at its output C' NRZ signals delayed by half a clock period, as is shown by waveform C' in FIG. 4.

These signals (C') from the output of delay flipflop FF2' are supplied to one input of an EXCLUSIVE-OR gate G12, which has its output connected to the D-input of a delay flipflop FF3'. The non-inverted output from this delay flipflop is fed back to another input of the EXCLUSIVE-OR gate G12 so that at the inverted output D' of the delay flipflop (FF3'), the signals shown (in FIG. 4) as waveform d' is produced. FF3' is clocked with signal $\overline{\text{clock}}$.

The input B' for NRZ signals is also connected to the D-input of delay flipflop FF4'. This delay flipflop is clocked with clock signals and delivers at its inverted output E' the signals shown as waveform e' in FIG. 4, which are $\overline{\text{NRZ}}$ signals delayed by one clock period.

The output lines D' and E' from the inverted outputs of delay flipflop FF3' and FF4', respectively, are connected to inputs of an OR gate G7'. From this OR gate, the control signals shown as waveform f' (in FIG. 4) are produced on output line F' when the NRZ-signals shown as waveform b' are supplied to the input B' of the encoder circuit.

Figure 4:
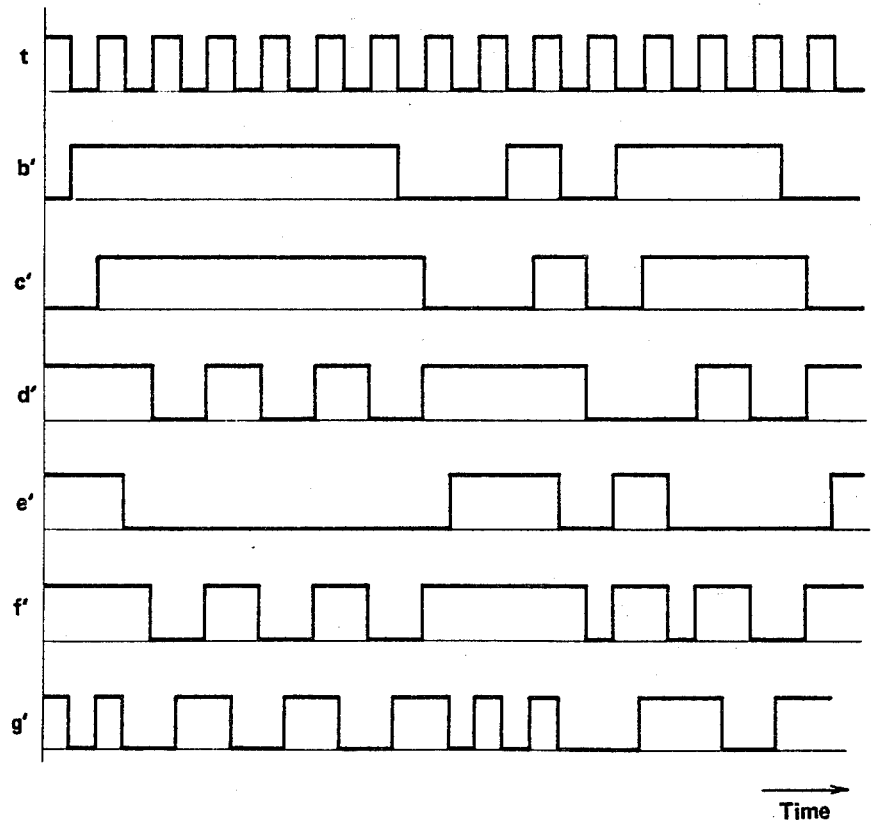
FIG. 4 is a timing diagram of the signals appearing at different points in the circuit of FIG. 3.

The EXCLUSIVE-OR gate G11' receives the clock pulses from input T (which clock pulses are inverse in form to those of waveform "t" in FIG. 4) delayed by the delay circuit $D_O'$ as well as the control signals shown as waveform f' from OR gate G7', and produces therefrom the CMI encoded output signals at its output G'. As in the case of the first embodiment, the delay provided by delay circuit $D_O$ is approximately equal to the delay in the control signals shown as waveform f' on line F'.

Figure 5:
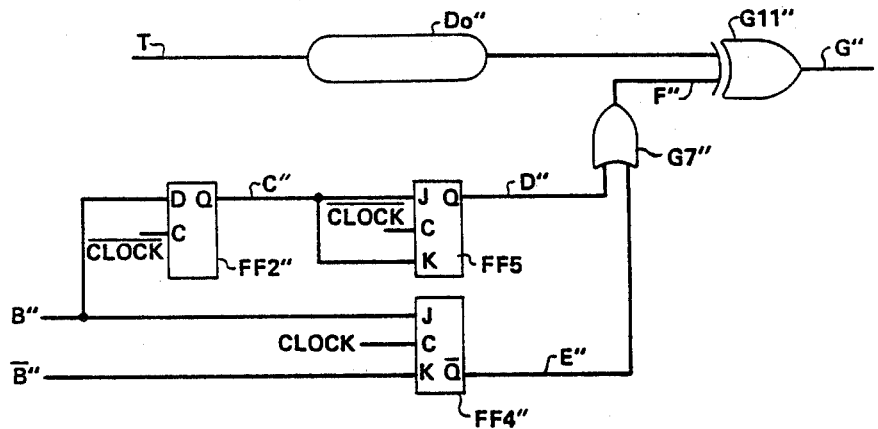
FIG. 5 is a schematic diagram of a third preferred embodiment of the CMI encoder logic circuit of the present invention for deriving all trailing edges in the CMI encoded output signals from clock related pulses.

In the embodimemt of FIG. 5 there is provided an input T for clock signals which are delayed by a delay circuit $D_0''$ and are supplied to one input of an EXCLUSIVE-OR gate G11''.

Figure 6:
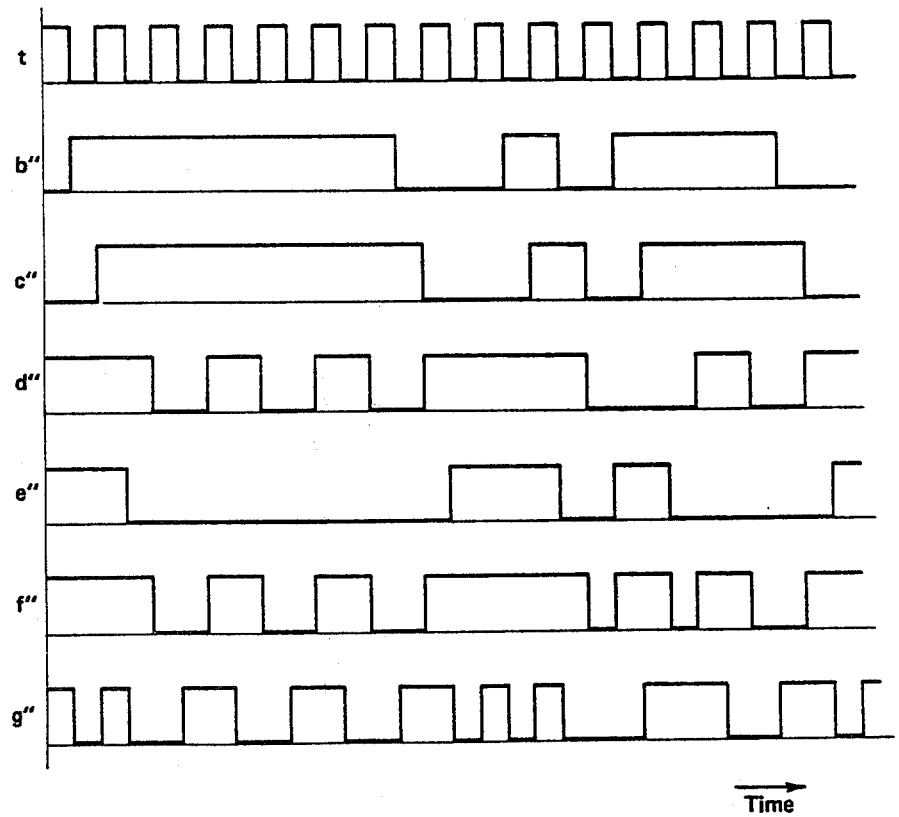
FIG. 6 is a timing diagram of the signals appearing at different points in the circuit of FIG. 5.

The NRZ-signals to be encoded are supplied to a D-input of a delay flipflop FF2'' which is clocked with CL signals. The signal at the non-inverted output C'' of FF2'' is delayed by half a clock period relative to the input signals as shown in waveform c'' of FIG. 6. The output C'' is connected to the J-input and to the K-input of a JK-flipflop FF5, which flipflop has a non-inverted output D'' conducting signals shown as waveform d'' (in FIG. 6). These signals (d'') are RZ signals divided by 2.

The input signals are also supplied to a J-input of another JK-flipflop FF4'' and the inverse of input signal b'' (i.e., signal $\overline{b''}$) is supplied to the K-input. At output line E'' the signals shown as waveform e'' are produced. Lines D'' and E'' are connected to inputs of an OR gate G7'' with an output line F'' conducting signals shown as waveform f'' to the other input of EXCLUSIVE-OR gate G11''. This EXCLUSIVE-OR gate G11'' produces on output line G'', CMI-encoded output signals shown as waveform g'' in FIG. 6.

In summary, features of the invention disclosed herein include:

The second and third signal channel each include a flipflop of the same type, preferably arranged to cause the same temperature induced switching delay. The clock inputs of all flipflops are connected to receive clock related pulses and are thus clocked at accurate points in time, independent from the possibly time-shifter occurrence of the NRZ signals.

All negative transitions of the CMI encoded waveform are derived directly by the gating of trailing edges of the $\overline{\text{clock}}$ signal.

The positive transitions (rising edges) of the CMI encoded waveform are derived directly by $\overline{\text{gating}}$ the positive transitions of either the clock or $\overline{\text{clock}}$ signals, depending on the state of the NRZ signal to be encoded.

As will be obvious to the designer of logic circuits, various modifications to the preferred embodiments can be made based on the disclosure made herein. For example, the noninverting OR gates could be implemented by "wired OR" connections; the logic functions could be performed by (combinations of) other gates such as NAND-gates, or other kinds of flip-flops could be used and signal inversions could be provided. Also, the embodiments of FIG. 1, 3 or 5 could be modified to give the logical inverse of the normal CMI; this could be achieved by inverting the output of the final gate in FIG. 1, 3 or 5, by inverting the clock signal supplied to the delay circuits Do, Do' or Do''.

I claim:

1. An encoding circuit for encoding digital data in a two amplitude level signal in accordance with the "coded mark inversion" (CMI) format, i.e. in which binary 0 is encoded so that both amplitude levels are obtained consecutively, each for half a unit time interval, and binary 1 is encoded by either of the amplitude levels for one full unit time interval, in such a way that the level alternates for successive binary 1's, all negative transitions of the binary signals occurring at a time coincident with the start of a binary unit time interval, said encoding circuit providing such encoded digital data in response to substantially synchronous input data received in a non-return-to-zero (NRZ) format and from clock related pulses received via input signal channels, said encoding circuit comprising:

first signal channel means for providing clock related pulses on an output control line in response to input clock pulses received on said input signal channel; said clock related pulses being defined as being substantially equivalent to the clock signal or its logical complement;

second signal channel means coupled to said first signal channel means having at least one flip-flop, for deriving reclocked NRZ data in response to the input data received in an NRZ format and the clock related pulses via said first signal channel;

third signal channel means, coupled to said first and said second signal channel means and having gating and flip-flop circuits for deriving a commutating control signal which changes logic states only in response to the representation of one binary value, i.e. either one or zero, in the train of NRZ input data and upon occurrence of one preselected kind of transition in said clock related pulses, i.e., either a rising or falling signal edge;

output circuit means coupled to said first, second and third signal channel means for providing the CMI coded output signals by selectively gating the clock related pulses to an output terminal in response to a pair of complementary output control signals;

output control means coupled to said third signal channel means and said output circuit means and having inverting and non-inverting outputs for providing said complementary output control signals in response to said commutating control signal; and all flip-flop circuits of the first, second and third signal channel means, the output circuit means and the output control means being exclusively triggered by signal edges of the clock related pulses provided by said first signal channel means, thereby minimizing the distortion of clock information in the CMI encoded output signals.

2. The encoding circuit as in claim 1 wherein said first signal channel means includes a first gating element having an inverting and a non-inverting output for providing said clock related pulses in response to said input clock pulses.

3. The encoder circuit as in claim 2 wherein said second signal channel means comprises a first flip-flop having a signal input terminal and a clock input terminal and a non-inverting output for providing a first intermediate signal and an inverting output for providing a second intermediate signal, and having logic means for providing a data output signal in response to said first intermediate signal and said clock related pulses.

4. The encoder circuit as in claim 3 wherein said third signal channel means comprises a second flip-flop means for providing a second control signal in response to said second intermediate signal and said clock related pulses.

5. The encoder circuit as in claim 4 wherein said logic means of said second signal channel means further comprises third flip-flop means for providing third complementary output signals in response to said first intermediate signal and said clock related pulses; steering gating means coupled to said third flip-flop means for providing a fourth input signal in response to said third complementary output signals and feedback signals from the outputs of a fourth flip-flop means, and fourth flip-flop means for providing a gating output signal in response to said fourth input signal and said clock-related pulses.

6. The encoder circuit as in cliam 5 wherein said output control means comprises a means for providing a logical OR function in response to said gating output signal and said second control signal, said complementary output control signals being provided in response to said logical OR operation.

7. The encoder circuit as in claim 6 further comprising a delay means for providing a predetermined time delay in the clock related signals coupled to said output means.

8. The encoder circuit as in claim 7 wherein said output means comprises gating means for providing said CMI encoded digital signal in response to said delayed clock-related pulses and said complementary output control signals.

* * * * *

UNITED STATES PATENT AND TRADEMARK OFFICE
CERTIFICATE OF CORRECTION

PATENT NO. : 4,189,621
DATED : February 19, 1980
INVENTOR(S) : Peter M. Scott

It is certified that error appears in the above-identified patent and that said Letters Patent are hereby corrected as shown below:

Column 1, line 66, delete "ANDgates" and insert --AND-gates--.

Column 4, line 55, delete "NOR-gate" and insert --NOR-gates--.

Column 5, line 58, delete "$\overline{\text{clock}}$" first occurrence and insert --clock--.

Column 5, line 58, delete "clock" second occurrence and insert --$\overline{\text{clock}}$--.

Column 7, line 35, delete "time-shifter" and insert

--time-shifted--.

Signed and Sealed this

Nineteenth Day of August 1980

[SEAL]

Attest:

SIDNEY A. DIAMOND

Attesting Officer  Commissioner of Patents and Trademarks

UNITED STATES PATENT AND TRADEMARK OFFICE
CERTIFICATE OF CORRECTION

PATENT NO. : 4,189,621
DATED : February 19, 1980
INVENTOR(S) : PETER M. SCOTT

It is certified that error appears in the above-identified patent and that said Letters Patent are hereby corrected as shown below:

On the title page,
Under item (73), the Assignee should read:

-- Hewlett-Packard Limited
   West Lothian, Scotland --.

Signed and Sealed this

Nineteenth Day of April 1983

[SEAL]

*Attest:*

*Attesting Officer*

GERALD J. MOSSINGHOFF
*Commissioner of Patents and Trademarks*